United States Patent [19]

Healy

[11] Patent Number: 4,506,324
[45] Date of Patent: Mar. 19, 1985

[54] SIMULATOR INTERFACE SYSTEM

[75] Inventor: Leonard D. Healy, Orlando, Fla.

[73] Assignee: The United States of America as represented by the Secretary of the Navy, Washington, D.C.

[21] Appl. No.: 355,400

[22] Filed: Mar. 8, 1982

[51] Int. Cl.³ ............................................. G06F 13/00
[52] U.S. Cl. ................................................... 364/200
[58] Field of Search ... 364/200 MS File, 900 MS File; 340/825.06

[56] References Cited

U.S. PATENT DOCUMENTS

| | | | |
|---|---|---|---|
| 3,824,550 | 7/1974 | Schoenwitz | 340/825.06 |
| 3,832,688 | 8/1974 | Strojny | 340/825.06 |
| 4,027,289 | 5/1977 | Toman | 364/900 |
| 4,047,155 | 9/1977 | Miller | 340/825.06 |
| 4,057,785 | 11/1977 | Furniss | 340/825.06 |

Primary Examiner—James D. Thomas
Assistant Examiner—David Y. Eng
Attorney, Agent, or Firm—Robert F. Beers; Robert W. Adams

[57] ABSTRACT

A linkage between a host computer and a plurality of external devices, such as a simulator system, utilizes a distributed processing network of individual data processors to process, control, and position data for transmission to and from said host computer on a data rate of change basis. A master processor interfaces with the host computer and is connected via a serial data link to a plurality of slave processors located at the external devices. Each processor determines the necessity for a transfer of data from its associated computer or device and controls data transmission therefrom accordingly.

11 Claims, 7 Drawing Figures

SIMULATOR INTERFACE SYSTEM

FIELD OF THE INVENTION

The present invention relates to electronics, and in particular to electronic interfaces. More particularly the present invention relates to an interface for use between a host computer and an external device. In still greater particularity, the present invention relates to an interface between a host computer and a simulator training device having sensors for response to said host computer. In even greater particularity, the present invention relates to an interface network having an intelligent microcomputer based master processor located at said host computer communicating with a plurality of microcomputer based slave processors located at said simulator's components.

BACKGROUND OF THE INVENTION

Simulators require a means of connecting the digital computer, which represents information by bit patterns in its memory, to external simulation equipment, which represents information by switch closures, indicator lights, control stick deflections, etc. The linkage between the computer and the external devices must handle two classes of data: (1) analog data, where the computer information is translated into a physical quantity, and (2) discrete data, where computer information is translated into on/off signals such as switch closures. The translation from analog and discrete data to the computer representation of information is also required.

Most simulators perform the conversion in hardware that is physically adjacent to the central computer, thus requiring hundreds of interconnection lines. Cable runs of fifty to one hundred feet are not uncommon, and the mass of wire presents a significant problem. Additionally, many of the cables carry analog signals which are more susceptable to noise than digital signals, thus dictating shielding of signal lines and a more elaborate grounding system than is required for digital signal transmission.

Placing the conversion equipment at the place where the signal is used, rather than at the digital computer avoids the cabling problems described, inasmuch as data is transmitted via a serial data transmission line consisting of only a few signal lines. However, a digital computer system can provide data one to two orders of magnitude faster than data can be transmitted over a serial line. Delay in the transmission of data adds directly to computational delays, resulting in an overall lag between student input to a simulator and the correct simulator response.

SUMMARY OF THE INVENTION

The present invention overcomes the above discussed and other deficiencies and disadvantages of the prior art through the use of an intelligent microcomputer based linkage network. The system organization requires a microcomputer based processor at the interface to the host computer and a microcomputer based processor at each location where conversion is performed.

Transfer of data from the host computer to the master processor is accomplished by a high speed parallel data transfer. The master processor processes this data and sends information to the distal slave processors via a serial transmission line. At the same time, the slave processors transmit data from the simulator to the master controller. When the data transfer is complete, the master processor transmits the data it has received to the host computer.

The unique feature of this system is its ability to use extrapolation of data to reduce transmission bandwidth. This system does not transmit data at a fixed rate. Data is transmitted between the master processor and a slave processor only when the processor requiring the data cannot extrapolate the data within accuracy bounds without outside intervention. Thus, a slowly varying signal is transmitted at a low rate, but when said signal begins to change rapidly, the information is transmitted at a high rate.

It is an object of this invention to provide an effective linkage between a host computer and external simulator devices without bulky cabling requirements.

It is a further object of this invention to provide a rapid response capability across a serial link between a host computer and an external simulator device.

Yet another object of this invention is to provide a generic computer to simulator interface, independent of the unique hardware of a particular trainer, which embodies the above object.

The features of the invention desired to be protected are set forth in the appended claims. The invention itself, together with further objects and advantages thereof, may best be understood by referring to the following description taken in conjunction with the appended drawings.

DESCRIPTION OF A PREFERRED EMBODIMENT

The embodiment described herein is the prototype for use with the Navy's Visual Technology Research Simulator. It is to be understood that although the present description relies on said prototype, the invention itself and the claims which define it are not intended to be limited by this description which is merely illustrative.

Figure 1:
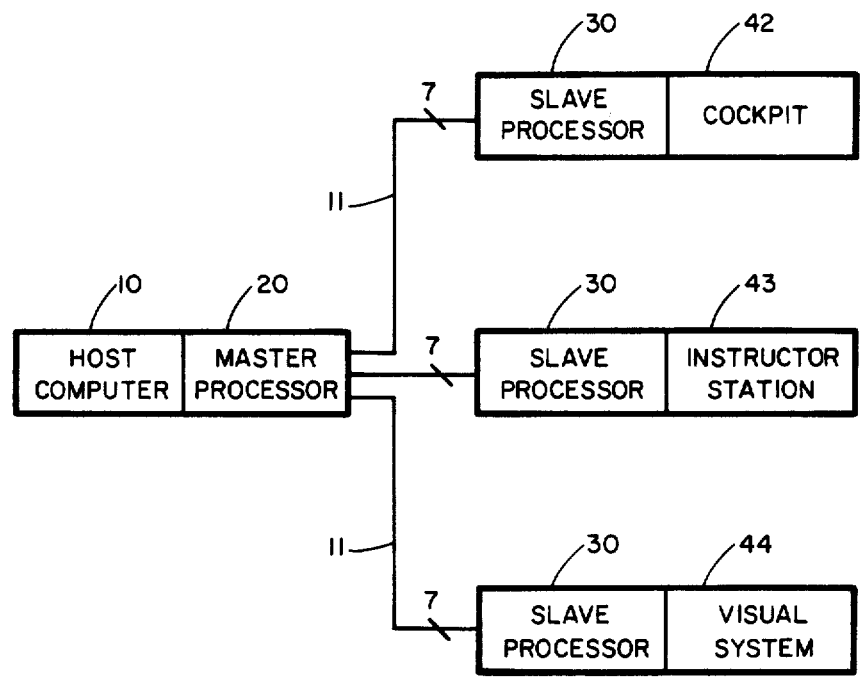
FIG. 1 is a block diagram of the system as it relates to the host computer and external simulator devices.

The basic block diagram showing the concept of a serial linkage system instead of a parallel linkage is presented in FIG. 1, wherein a host computer 10 is linked with a master processor 20, which in turn is linked to a plurality of slave processors 30 via a serial data line 11. In the prototype, the existing VTRS seven-line serial data link is used although said serial data line 11 may be other than a seven-signal cable configuration, preferably a standard bus such as MIL-STD-1588A. Slave processors 30 communicate with the external devices which make up the simulator 40, such as a cockpit 42, an instructor station 43, and a visual system 44.

Figure 2:
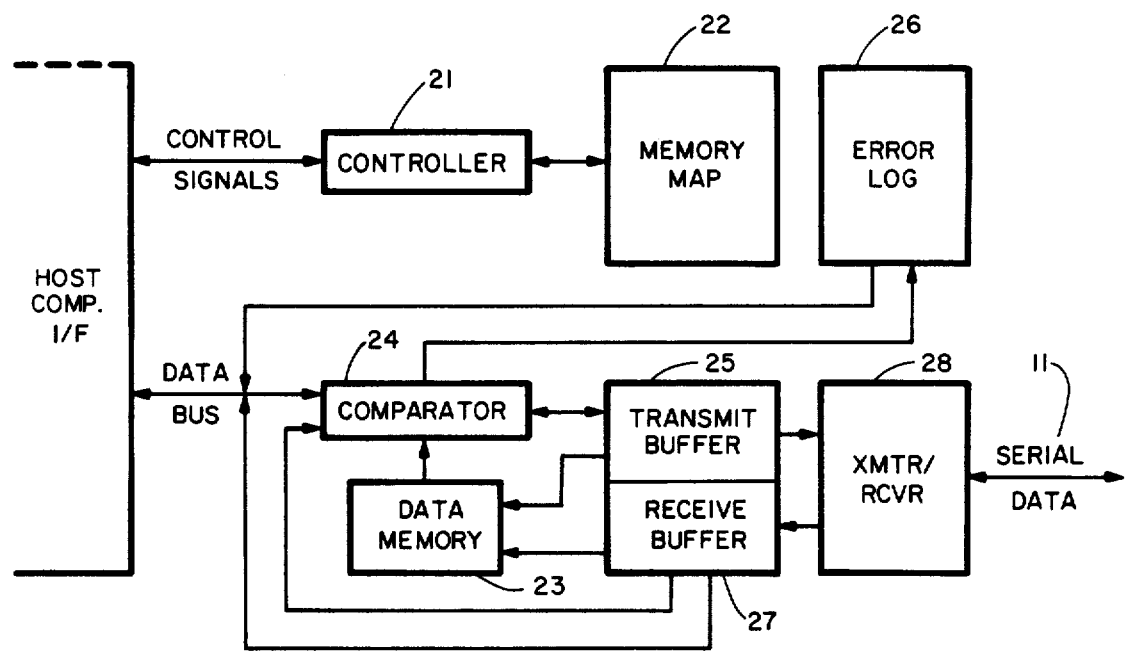
FIG. 2 is a functional block diagram of the master processor unit.

A functional block diagram of master processor 20 is presented in FIG. 2. Master processor 20 is connected to the host computer 10 through the existing VTRS interface and to slave processors 30 through data link 11. Data transfers between master processor 20 and computer 10 are performed by direct access to the memory of computer 10, providing 32-bit parallel transfer at rates up to 834,000 words per second. Timing of transfers is governed by a handshaking protocol. The physical interface consists of 32 data lines and 15 control lines.

The connections shown in FIG. 2 indicate data flow. Control connections to each element are not shown.

A controller 21 provides the interface signals to computer 10 to cause data transfers to be performed and provides gating and timing signals within master processor 20.

A memory map 22 provides data to controller 21 relating memory location in host computer 10 to data type, data location in slave processors 30 and data location in a data memory 23 of master processor 20.

A comparator 24 determines whether the data contents of data memory 23 matches the input data. If the two do not match, the input data is sent to a transmit buffer 25. In a test and verification mode, data that do not agree are sent to an error log 26.

Data memory 23 holds the present value of each variable, and past values of each variable if a more complex extrapolation technique is used. Data for analog quantities are held in both floating point and integer format to save computation time. The integer format data is updated on each cycle, and the floating point format data is updated only when data changes.

Transmit buffer 25 stores data received from host computer 10 that does not match corresponding data in data memory 23. Data in buffer 25 is transmitted to the appropriate slave processor 30 via serial transmission line 11.

A receive buffer 27 stores data from slave processors 30 until it can be processed. This data is used to update the information sent to host computer 10.

Transmitter/receiver 28 takes parallel data from transmit buffer 25, formats it, and sends the data serially to slave processors 30. At the same time transmitter/receiver 28 accepts serial data from slave processors 30 and stores it in receive buffer 27.

Figure 3:
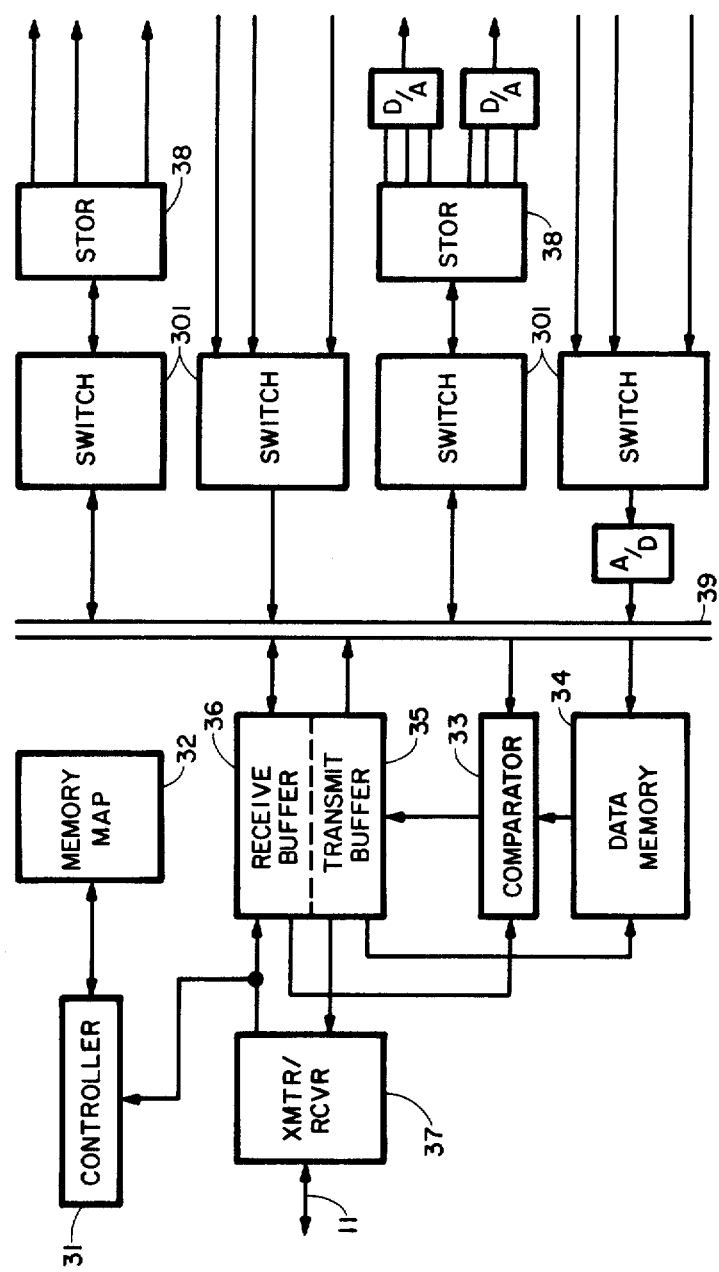
FIG. 3 is a functional block diagram of a slave processor unit.

FIG. 3 presents a functional block diagram of the complete slave processor 30. In the prototype linkage, the blocks to the right of the bus 39 are not implemented. Communication between slave processors 30 and system cards 41 which provide connection to the simulator 40, uses the linkage pre-existing in the VTRS.

Referring to FIG. 3, a slave controller 31 provides interface signals to system cards 41 to cause data transfer to be performed and provides gating and timing signals within slave processor 30.

A slave memory map 32 provides data to controller 31 relating memory location within slave processor 30 to data type, system card address, and data location in the data memory 23 of master processor 20.

A slave comparator 33 determines whether comparable data in a slave data memory 34 matches the input data from the simulator device or master processor 20. If the data does not match, the input data is sent to a transmit buffer 35, regardless of mode.

Slave data memory 34 holds the present value of each variable, or the past values of each variable. The memory content is updated each time the data changes.

A slave transmit buffer 35 stores data received from system cards 41 that does not match corresponding data in slave data memory 34. Data in this buffer is transmitted to master processor 20 via serial transmission line 11. Changed data received from master processor 20 is also stored in buffer 35 until transmitted to simulator 40.

A slave receive buffer 36 stores data from system cards 41 until it can be processed by the comparator 33. This data is used to update the information sent to master processor 20.

A slave transmitter/receiver 37 takes parallel data from transmit buffer 35, formats it, and sends it serially to master processor 20. At the same time, transmitter/receiver 37 accepts serial data from master processor 20 and stores it in receive buffer 36.

A digital storage 38 is provided to hold discrete information sent from slave processor 30 to an output interface. This is logically equivalent to a data memory, but is implemented in static registers in order to drive external devices. In the prototype linkage, this function is provided by the existing system cards 41.

A plurality of switches 301 controlled by slave processor 30 provide the multiplexing and demultiplexing to select elements in digital storage 38. For analog inputs, an analog switch selects which analog signal is to be converted. This function is provided by system cards 41.

Communication between host computer 10 and simulator 40 is a cyclic update of control and status data. The data transfer sequence begins with a signal from host computer 10 to master processor 20. This signal is transmitted to each slave processor 30 via the serial data link 11.

Simultaneously, data is transferred from host computer 10 to master processor 20 and from simulator 40 to slave processor 30. Master processor 20 then determines changes in the data it receives, including changes in predictions, and determines which slave processor should receive the changed data. Slave processor 30 determines changes in the data, including predictions, received from simulator 40.

Any changes found by master processor 20 are output on data to slave processor 30, and vice versa. Otherwise, no transfer of data need be effected. The data transfer for the cycle is completed by transfer of changed data from master processor 20 to computer 10, and from slave processor 30 to simulator 40.

It will be noted that the use of a serial data link 11 between master processor 20 and slave processors 30 is the physical expedient to eliminating the mass of cables of the prior art. The use of a serial data link is made possible by the novel ability of the system to use extrapolation of data to reduce transmission bandwidth. The conventional method of treating data in simulators is to transmit data at a fixed update rate determined by the transmission bandwidth. The present system does not transmit data at a fixed rate. Data is transmitted between master processor 20 and slave processor 30 only when the processor requiring the data cannot extrapolate the data within accuracy bounds without outside intervention. Thus a slowly varying signal is transmitted at a low rate, and when said signal begins to change rapidly, the information is transmitted at a high rate.

The degree to which the extrapolation of signals is successful sets the bounds on the effectiveness of the linkage system. In addition, extrapolation of signals is the major computation performed by master processor 20 and slave processors 30.

The preferred extrapolation technique is the application of Lagrange interpolation to prediction of the next value in a sequence, and is based on (1) equally spaced values of the independent variable and (2) use of only the last N values of the function to determine the best estimate of the next value. The method is to fit a polynomial of degree N−1 through the N values and use that polynomial to compute the estimate. For prediction of the next sample point following the N known point, this formula reduces to $$Y_{n+1} = \sum_{i=0}^{N} Y_i \left[ (-1)^{i+1} \binom{N+1}{i} \right].$$

It has been determined that the use of the zero order polynomial will provide sufficiently accurate predictions while yielding the minimum computation time. Thus, a sample and hold approach to extrapolation of data is used.

The basic design selected for implementation is a network of microcomputers arranged as a distributed processing system. This configuration is used to perform the bulk of the computations required to convert between floating-point and integer representation of values and the extrapolated values, and determine which values must be transmitted.

Figure 4:
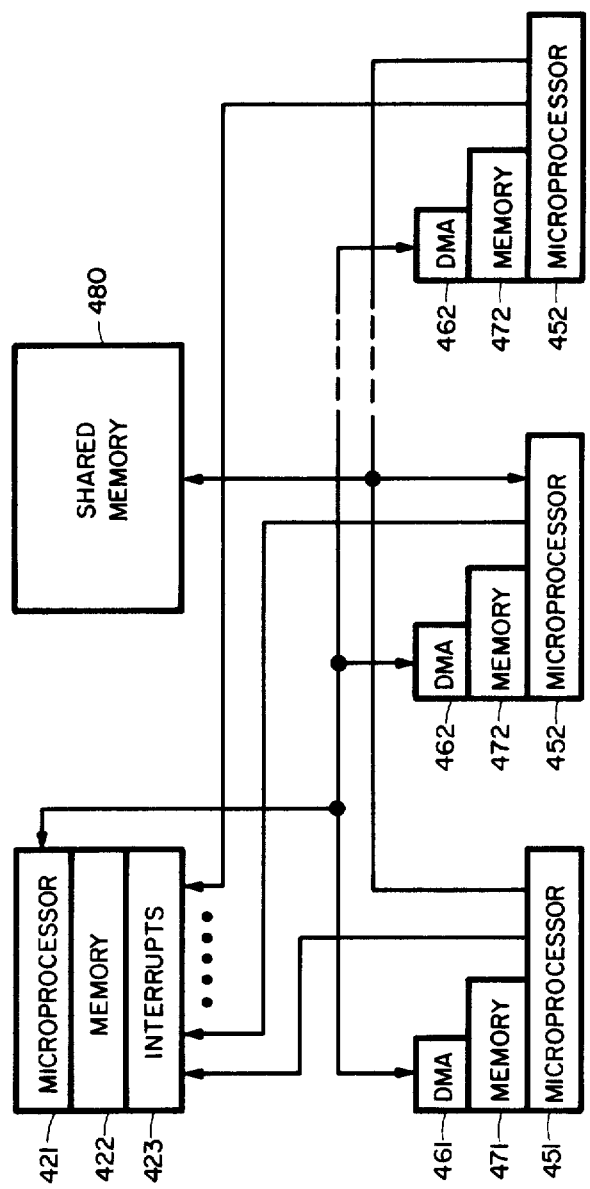
FIG. 4 is an implemental block diagram of the microcomputer network.

FIG. 4 shows a block diagram of the multiple microcomputer configuration used in implementing the master and slave processors. The controller function is implemented by a single microprocessor 421, its associated private memory 422, and interrupt handler 423. The communication between the network 450 of microprocessors 451, 452, 453 is via individual direct memory access (DMA) channels 461, 462, 463 to each microprocessor's private memory 471, 472, 473. There is also a provision to allow each of the microprocessors 451, 452, 453 to interrupt the controller 421 via interrupt handler 423. In addition to private memories 471, 472, 473 there is a shared memory 480 which holds memory map 22, data memory 23, and error log 26. Private memories 471, 472, 473 are provided to avoid the time lost in waiting for memory access that would occur if all processors shared a single memory.

Figure 5:
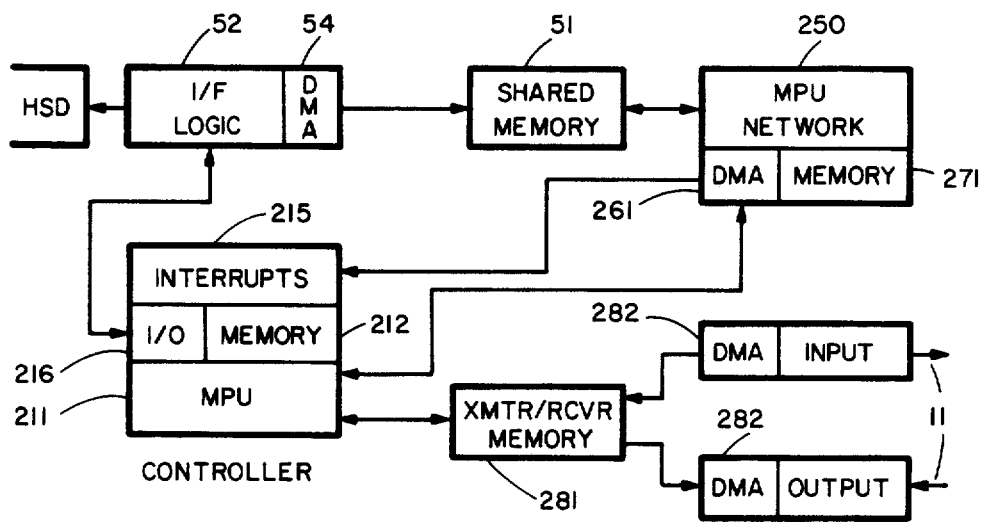
FIG. 5 is an implemental block diagram of the master processor.

Referring to FIG. 5, which illustrates the master processor implementation, controller 21 is comprised of a microprocessor 211 with its own private memory 212 and access to shared memory via its input-output (I/O) interface 216. The controller 21 is connected to the microcomputer network 250 via DMA channels 261 and interrupt handler 215 as described earlier. Controller 21 is also connected to the transmitter/receiver memory 281. In addition to its functions as controller 21, microprocessor 211 performs the functions of the comparator 24.

Interface logic 52 communicates with shared memory 51 via DMA channel 54. Interface logic 52 generates the signals necessary to transfer data between host computer 10 and shared memory 51 under the control of I/O channel 216. Interface logic 52 interrupts controller 21 on each request for action from host computer 10.

Transmitter/receiver 28 accepts data from microprocessor 211 for transmission to slave processors 30. Data to be transmitted placed in transmitter/receiver memory 281 is accessed via DMA channel 282 and sent in serial format to slave processors 30. Transmitter 28 also accepts data from slave processor 30 via serial link 11 and stores the data in memory 281. These transmit and receive functions of transmitter/receiver 28 are controlled by separate input and output channels 217 and 218 (not shown).

Figure 6:
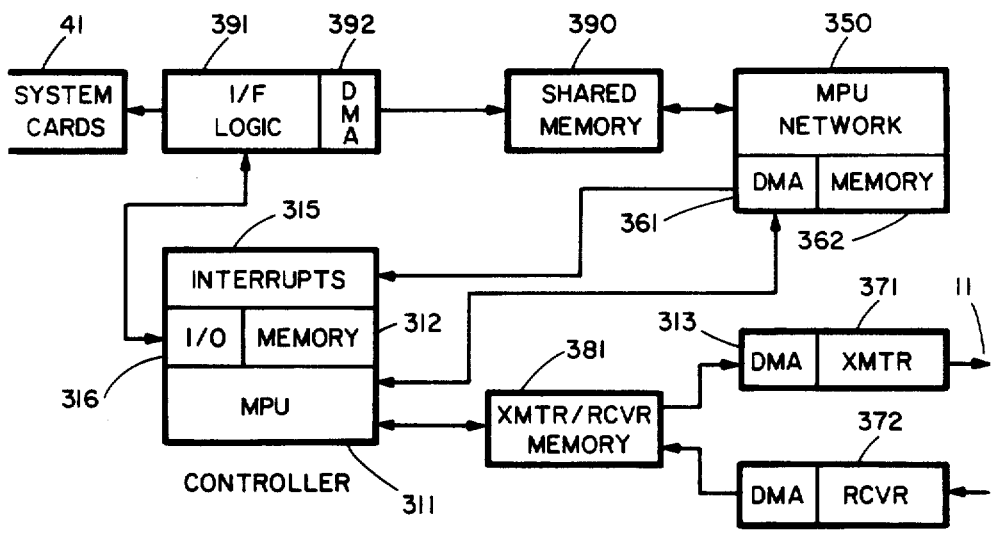
FIG. 6 is an implemental block diagram of the slave processor.

Referring to FIG. 6, which illustrates the slave processor implementation, controller 31 is comprised of a microprocessor 311 with its own private memory 312 and access to shared memory 390 via its input-output (I/O) interface 316. The controller 31 is connected to the microcomputer network 350 via DMA channels 361 and interrupt handler 315 as described earlier. Controller 31 is also connected to the transmitter/receiver memory 381. In addition to its functions as controller 31, microprocessor 311 performs the functions of the comparator 33.

Interface logic 391 communicates with shared memory 390 via DMA channel 392. Interface logic 391 generates the signals necessary to transfer data between system cards 41 and shared memory 390 under the control of I/O channel 316.

Transmitter/receiver 37 accepts data from microprocessor 311 for transmission to master processor 20 via data link 11. Data to be transmitted placed in transmitter/receiver memory 381 is accessed via DMA channel 313 and sent in serial format to master processor 20. Receiver 372 accepts data from master processor 20 via serial link 11 and stores the data in memory 381.

In operation, master processor 20 compares the present value of each variable received as data from host computer 10 to its previous value to see whether a preset tolerance is met. If the tolerance is exceeded, the value is translated from the floating point format used in host computer 10 into a scaled fixed point value used for digital to analog conversion. This new value, together with addressing information, is placed in a buffer memory for transmission to slave processor 30. Microprocessor 20 also converts scaled fixed point values received from slave processor 30 into floating point format for transmission to host computer 10.

Slave processor 30 compares the present value of each of its stored variables to the values received from system card 41 to see whether a preset tolerance is met. If the value exceeds the tolerance, the value and its address are placed on a buffer memory area for transmission to master processor 20.

Figure 7:
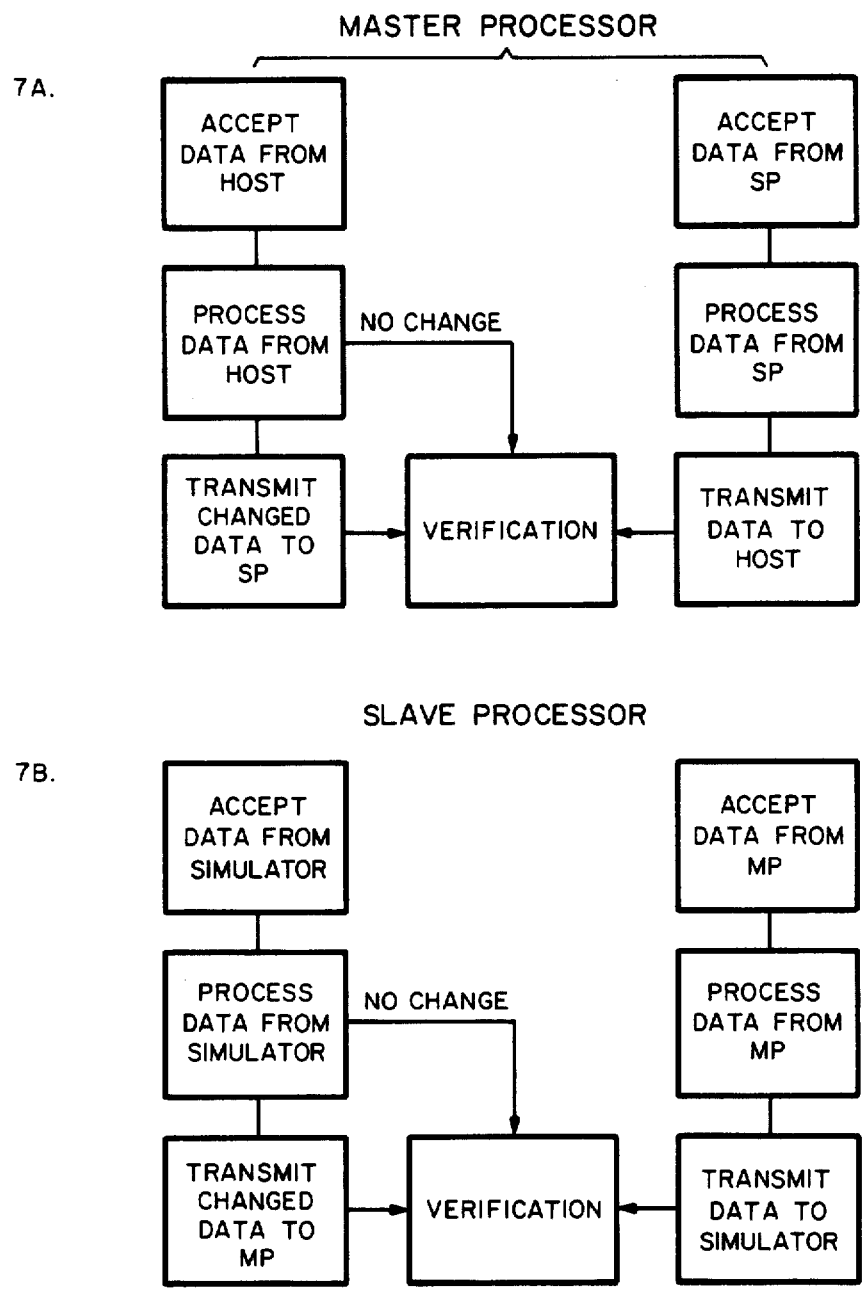
FIG. 7 is a flow chart of the interface operation.

Reference to FIGS. 7a and 7b will assist in understanding the following sequence of events. In master processor 20, data acceptance from host computer 10 is initiated by a command from host computer 10. Controller 21 sets DMA channel 34 to accept the data transfer.

Data processing is initiated upon completion of the above data transfer. Controller 21 assigns the processing sequentially to each of the microcomputers 271 in microcomputer network 270. This step determines changes in data. The microcomputers 271 respond with interrupts when a process is complete and controller 21 assigns the next operation.

If the data change exceeds a preset tolerance, the next step is to format said changed data and place it in a stack for transmission. This operation is more complex than it appears, since DMA channel 281 for transmission is automatically taking data from the stack. If no value exceeds the tolerance, no update data is transmitted to slave processor 30 during this cycle.

If data from slave processor 30 is received during the cycle, controller 21 assigns it sequentially to the next microcomputer in network 270 for conversion and formatting. This operation is carried on at the same time as processing data from the host computer.

Verification is undertaken during the dead time after all data processing for the cycle is complete. Master processor 20 transmits data to slave processor 30 and responds to the replies from slave processor 30. Data that is incorrect is retransmitted. Steady state errors are reported to host computer 10 immediately; intermittent errors are recorded in error log 26 and are reported only if the number of errors exceeds a preset threshold.

Meanwhile, slave processor 30 steps through its process wherein data is sampled and accepted from system cards 41 upon a signal from master processor 20.

The data is then processed in the same manner as in master processor 20, i.e., slave controller 31 assigns the processing sequentially to each microcomputer in network 350. This step compares the received data for changes in data. The data which does not fit within the tolerance is then formatted and transmitted to master processor 20. If no data exceeds the preset tolerance, then no data update is transmitted.

Simultaneously with the processing of data from system cards 41, data accepted via serial data link 11 from master processor 20 is formatted and converted for transmission as control signals to simulator 40.

Verification with master processor 20 is accomplished during the dead time after all data processing for the cycle has been completed. Data from master processor 20 is accepted and compared with slave processor values. Any discrepancies are reported for master processor retransmission during the next cycle.

Although the foregoing description has described the system by referring to only a single master processor and slave processor, it is to be understood that a number of slave processors are contemplated to efficiently operate from a single master processor, and any number of master processor - slave processor combinations may be used to transmit the data in accordance with the particular needs of the host computer and the external device.

Furthermore, while the invention has been described with reference to a preferred embodiment, it will be appreciated by those skilled in the art that additions, deletions, modifications, and substitutions or other changes not specified may be made which will fall within the purview of the appended claims.

What is claimed is:

1. An intelligent linkage for data transfer between a host computer and external devices where the data to be transferred are variable based on control and status data, comprising in combination:
   a microprocessor based master processor having first means coupled to said host computer for controlling data transfer from said host computer to said master processor, first means connected to said first data transfer controlling means for determining changes in data received from said host and determining the appropriate external device associated therewith, first means connected to said said first determining means for communicating said changes in data to said external device via a microprocessor based slave processor, and second means coupled to said host computer and to said slave processor for controlling data transfer from said master processor to said host computer;
   said microprocessor based slave processor having third means coupled to said external device for controlling the transfer of status data from said external device to said slave processor, second means connected to said third controlling means for determining changes in said data received from said external device, second means connected to said second determining means for communicating said changes in data to said host computer via said master processor, fourth means coupled to said external device for controlling data transfer from said slave processor to said external device; and
   means coupling said second data communicating means of said slave processor and said second controlling means of said master processor, and said first data communicating means of said master processor and said fourth data controlling means of said slave processor, for serial transmission of said data.

2. The linkage of claim 1 wherein said first data transfer controlling means in said master processor comprises:
   controller means coupled to said host computer, for providing interface signals to said host computer to cause data transfers and for providing gating and timing signals for said master processor; and
   memory map means coupled to said controller means, for providing data to said controller means relating memory locations in said host computer to data type, data location in said slave processor, and data location in said master processor.

3. The linkage of claim 2 wherein said first means for determining changes in data in said master processor comprise:
   data memory means connected to said first means for communicating changes in data, for holding the value of the latest data communicated from said master processor to said external device; and
   comparator means for determining whether control data input from said host computer matches the data held in said data memory means, connected to receive inputs from said data memory means and said host computer and having an output coupled to said communicating means.

4. The linkage of claim 3 wherein said first data communicating means in said master processor comprises;
   a receiver/transmitter means connected to said serial data transmission means for receiving status data from said slave processor while sending control data to said slave processor;
   transmit buffer means connected to said comparator means for storing changes in data output by said comparator means and having output coupled to said receiver/transmitter means and said data memory means for transferring data to said data memory means simultaneously with the transfer of said data to said slave processor, thereby updating said data memory means for each transfer of data; and
   receiver buffer means connected to said receiver/transmitter means for storing said status data from said slave processor until processed by said master processor and connected to said data memory means and said comparator means for receiving data from said receiver/transmitter means and outputting data to said comparator means and said data memory means.

5. The linkage of claim 1 wherein said first data communicating means in said master processor comprises:
   a receiver/transmitter means connected to said serial transmission of data means, for receiving said status data from said slave processor while sending said control data to said slave processor;

transmit buffer means connected to said first determining means and to said receiver/transmitter means, for storing changes in data output by said first determining means; and receive buffer means connected to said receiver/transmitter means and to said first determining means, for storing data from said slave processor until processed by said master processor.

6. The linkage of claim 1 wherein said second means for determining changes in data received from said external device, comprises:

data memory means connected to said second data communicating means, for holding the latest value of each data transmitted to said host computer from said external device; and comparator means coupled to said data memory means and to said third controlling means, and to said second data communicating means, for determining whether the value in said data memory means matches the data value received from said external device wherein said received data value is coupled to said comparator means by said data memory means under the control of said third controlling means and the effective output of said comparator means is provided to said second data communicating means.

7. The apparatus of claim 1 wherein said second means for communicating said changes in data comprises:

receiver/transmitter circuitry operably connected to said serial transmission means;

transmit buffer means connected to said receiver/transmitter circuitry for storing the changes in data determined by said second determining means for transmission to said host computer via said master processor; and receive buffer means connected to said receiver/transmitter and to said fourth data transfer controlling means for storing changes in data from said master processor and slave processor until processed by said slave processor.

8. The linkage of claim 1 wherein said master processor further comprises:

a shared memory including therein a data memory means for holding the latest value of each variable transmitted from said host computer to said external device, and also including a memory map means for relating memory location in said host computer to data type, data location in said slave processor and data location in said data memory;

an interface logic means operably connected to said host computer for generating signals to transfer data between said host computer and said shared memory, having direct memory access to said shared memory;

a controller comprising a first microprocessor with its own private memory and access to said shared memory, wherein said first microprocessor communicates with and controls said interface logic through an input/output connection, and further comprising a plurality of microcomputers, each having a private memory arrayed in a distributed network and connected via direct memory access to said first microprocessor, wherein each said microcomputer has accesss to said shared memory and provides an output to said first microprocessor;

a transmitter coupled to accept data from said private memory of said controller and send said data to the slave processor; and a receiver coupled to accept data from said slave processor and store said data in the private memory of said controller, and connected to and under the control of said controller, wherein said controller functions to determine said changes in data.

9. The linkage of claim 8 wherein said slave processor comprises:

a slave shared memory including therein a data memory means for holding the latest value of the status data transmitted from said external device to said host computer, and also including a memory map means for relating memory location within the slave processor to memory type, external device address, and data location in the data memory of said master processor;

system cards having said status and control data;

an interface logic means connected to said system cards for generating signals to transfer data between said system cards and said slave shared memory;

a controller comprising a controller microprocessor with its own private memory and access to said slave shared memory, wherein said controller microprocessor communicates with and controls said interface logic through an input/output connection, and further comprising a plurality of microcomputers, each having a private memory arrayed in a distributed network and connected via direct memory access to said controller microprocessor, wherein each said microcomputer has access to said shared memory and provides an output to said controller microprocessor;

a transmitter/receiver memory operably connected to said controller;

a transmitter operably connected between said transmitter/receiver memory and said serial data transmission means for transmitting data in said transmitter/receiver memory to said master processor, wherein said transmitter is coupled to receive said data via direct memory access; and a receiver coupled to accept data from said master processor and store said data in said transmitter/receiver memory, and connected to and under the control of said controller, wherein said controller functions to determine changes in data received from said external devices.

10. A method of simulation device control under a host computer via an intelligent interface comprising the steps of:

loading a control program into said host computer compatible with said simulation device;

transferring data to said interface from said host computer;

calculating in the interface in cyclic manner an extrapolated data prediction $Y_{n+1}$ based on N known prior data points in accordance with the reduced Lagrange polynomial which is $$Y_{n+1} = \sum_{i=0}^{N} Y_i \left[ (-1)^{i+1} \binom{N+1}{i} \right];$$

comparing said data prediction to said transferred data in each cycle;

transferring changes in transferred and extrapolated data to said simulator device as control signals;
transferring data to said interface from said simulator device concurrent with said data transfer from said host computer to said interface;
determining in the interface in cyclic manner an extrapolated data prediction $Y_{n+1}$ based on N known data points previously supplied from said external device, said determination in accordance with the formula $$Y_{n+1} = \sum_{i=0}^{N} Y_i \left[ (-1)^{i+1} \binom{N+1}{i} \right];$$

checking said predicted data point versus said supplied data point for each cycle of operation; and
transmitting changes in said predicted and received data to said host computer as response signals.

11. A method of controlling a simulator device utilizing a preprogrammed host computer, wherein said host computer communicates with said simulator device via an intelligent interface operably connected between the input and output of said host computer and said simulator device, comprising the cyclic steps of:
transferring control data from said host computer to said interface at time 1;
extrapolating in said interface a predicted control data point $Y_{n+1}$ based on N known prior data points in accordance with the equation $$Y_{n+1} = \sum_{i=0}^{N} Y_i \left[ (-1)^{i+1} \binom{N+1}{i} \right];$$

comparing in said interface said predicted data point to said transferred data at a time 2;
comparing in said interface said transferred data to data transferred in the next preceding cycle;
extrapolating in said interface a new predicted control data point based on said transferred control data and said equation;
transmitting changes in said control data or said predicted control data to said simulator device as control symbols at time 3;
transferring status data from said simulator to said interface at time 1;
extrapolating in said interface a predicted status data point, $Y_{n+1}$, based on N known status data points and said equation;
comparing in said interface said predicted status data and said transferred status data at time 2;
comparing in said interface said transferred status data to data transferred to said interface in the next preceding cycle;
comparing in said interface said predicted status data to data predicted in the next preceding cycle;
transmitting via said interface to said host computer any changes in predicted or transferred status data at time 3; and
verifying in said interface correlation between input control data and status data at time 4.

* * * * *